United States Patent
Ritter et al.

(10) Patent No.: US 7,366,290 B2
(45) Date of Patent: Apr. 29, 2008

(54) BILLING PROCESS AND SYSTEM IN A TELECOMMUNICATION NETWORK

(75) Inventors: Rudolf Ritter, Zollikofen (CH); Walter Heutschi, Jegenstorf (CH)

(73) Assignee: Swisscom Mobile AG, Bern (CH)

(*) Notice: Subject to any disclaimer, the term of this patent is extended or adjusted under 35 U.S.C. 154(b) by 98 days.

(21) Appl. No.: 11/144,836

(22) Filed: Jun. 6, 2005

(65) Prior Publication Data

US 2005/0222955 A1  Oct. 6, 2005

Related U.S. Application Data

(63) Continuation of application No. 09/508,422, filed as application No. PCT/CH98/00384 on Sep. 8, 1998, now Pat. No. 7,194,432.

(30) Foreign Application Priority Data

Sep. 15, 1997 (CH) .................................. 2175/97

(51) Int. Cl.
 *H04M 15/00* (2006.01)
 *H04M 11/00* (2006.01)
 *G06F 17/60* (2006.01)

(52) U.S. Cl. ............................. 379/114.2; 379/114.17; 455/406; 705/40

(58) Field of Classification Search ........... 379/114.01, 379/114.14, 114.17, 114.2, 114.03, 114.15, 379/114.16, 114.28, 114.25; 455/405–408, 455/558; 705/40–41

See application file for complete search history.

(56) References Cited

U.S. PATENT DOCUMENTS 5,027,388 A 6/1991 Bradshaw et al.
5,345,595 A 9/1994 Johnson et al.
5,359,642 A 10/1994 Castro
5,426,645 A 6/1995 Haskin
5,440,620 A 8/1995 Slusky
5,519,758 A 5/1996 Tabbane
5,561,706 A 10/1996 Fenner
5,594,940 A 1/1997 Peterson et al.
5,844,972 A 12/1998 Jagadish et al.
5,915,226 A * 6/1999 Martineau .................... 455/558

(Continued)

FOREIGN PATENT DOCUMENTS

| EP | 0 689 368 | 12/1995 |
|---|---|---|
| JP | 01108613 | 11/1990 |
| WO | 95/20298 | 7/1995 |
| WO | 97/21299 | 6/1997 |

*Primary Examiner*—Quoc Tran
(74) *Attorney, Agent, or Firm*—Oblon, Spivak, McClelland, Maier & Neustadt, P.C.

(57) ABSTRACT

A billing method and billing system to determine usage fees which are charged to the user of a digital telecommunications network, whereby a usage fee charged for a connection is determined prior to establishing this connection from statistical characteristics of previous connections of the user, is described. Usage fees are determined from a dynamic client profile, derived from one or multiple random variables of previous connections of the user, which is stored in memory and re-derived after each new customer connection. In a simple variant, the client profile contains a value proportional to the average price per connection or to the average duration of a connection of the user. The random variables used to derive the client profile include, for example, the connection duration, the time of day, the day of the week, and/or geographic characteristics of previous connections.

9 Claims, 3 Drawing Sheets

U.S. PATENT DOCUMENTS

| | | |
|---|---|---|
| 6,064,730 A | 5/2000 | Ginsberg |
| 6,115,613 A | 9/2000 | Jonsson |
| 6,198,915 B1 * | 3/2001 | McGregor et al. .......... 455/406 |
| 6,205,327 B1 * | 3/2001 | Sentinelli .................... 455/407 |
| 6,377,938 B1 | 4/2002 | Block et al. |
| 7,194,432 B1 * | 3/2007 | Ritter et al. .................. 705/34 |

\* cited by examiner

BILLING PROCESS AND SYSTEM IN A TELECOMMUNICATION NETWORK

CROSS-REFERENCE TO RELATED APPLICATIONS

This application is a continuation application of, and claims priority to, Ser. No. 09/508,422 filed Mar. 13, 2000, now U.S. Pat. No. 7,194,432 which is the national stage of PCT/CH98/00384 filed under 371 filed Sep. 8, 1998, which claims priority to Switzerland 2175/97 filed on Sep. 15, 1997.

The present invention relates to a billing system and a billing method for billing connections in a telecommunications network.

In the telecommunications field, a distinction is made between the communications provider, the service provider, and the user. The communications provider, in general a network operator, establishes the prerequisite for generating traffic by means of the infrastructure (fixed or mobile). The service provider can be the network operator himself, or or <sic.> a customer of this network operator, for example a service provider, for example a bank, which purchases airtime from an operator and sells it to the user as value added service. The user is a customer of a service provider. He uses a telecommunications system, and pays the service provider fees therefor, or he obtains a service (value added service) with a service provider.

In principle, the course of communication can be divided into two segments: signalling and traffic. The present invention relates to the determination of fees for both segments. Since, however, the signalling today is hardly charged for, only the determination of fees for the traffic segment will be described in the following. The traffic segment can be divided up into the following parts:

The carrier channels the traffic between the networks.

The operator runs the communications network, for instance a GSM, UMTS or IN network. He is the customer of the carrier.

The service provider is a customer of the operator, and obtains the communications service from him.

The service user is the end user, and is the customer of the service provider.

Determination of fees for traffic objects, for instance connections between carrier and operator, is carried out by means of the method known as interconnection. In principle, the same process, or a known variant via a classic billing system, can be used between the operator and the service provider. Traditionally, a classic billing system, for instance a system based on so-called call detail records (CDR), is used between the service provider and the user. Each connection is billed itemized.

These conventional billing systems are very dependent upon the infrastructure systems. Complex system interconnections are thereby created. Delivery of invoices today largely takes place on paper via the mail route. On the other hand, because there is a trend for the traffic fees to significantly drop, the cost ratio of revenue to billing expense is deteriorating. Moreover, such conventional billing systems generally do not enable user-dependent discounting. Moreover the systems cannot be combined well with pre-paid services which are increasing in significance.

More and more frequently, for instance in pre-paid systems, there is a demand for determining the connections and charging them to an account during or at the latest immediately after the connection. These requirements, however, call for the billing system to process in real-time all data determining the price of a connection. For instance, during or shortly after the connection, the billing system has to collect and process all the timing information and geographic data about the connection to be billed for, for example the duration of the connection, the time of day, the location of the calling and the called party, possible discounts, etc. just after the connection <sic>. A heavy load is thereby put on the billing system during peak hours and the billing system must be overdimensioned. Furthermore, depending on where the determination of the costs is executed, for instance in an operations center or in a SIM-card in a terminal device, it is sometimes difficult or even impossible to be provided with all the required information at the end of a connection. In mobile radio systems, for example, the CDRs needed for billing a call are not available until about 15 minutes after end of the call.

Therefore, in order to avoid these disadvantages, it is the object of this invention to establish the technical provisions for a new billing system and for a new billing method.

This object is achieved through a billing system and a billing method for the determination of usage fees incurred by a customer (operator, service provider or user) when using a digital telecommunications network which system and method comprise the features of the independent claims.

In particular, this object is achieved through a billing method in which the usage fees are determined from a dynamic client profile stored in a first memory area. The client profile is derived from one or multiple random variables from previous connections of the customer. Subsequent to new connections of the customer, the stored client profile is again dynamically derived.

A prediction can thereby be made about the connection costs during or even prior to the connection. These connection costs can, if necessary, be calculated immediately and charged to an account.

In a simple embodiment of the invention, the client profile is simply an average price per call derived from the customer's previous connections. However, the client profile preferably contains more statistical information about the behavior of the customer, for instance information about the duration of the client's connections. For example, the client profile may contain the number of connections in predefined classes of duration, and/or the mean value and variance of the duration of the client's connections. The amount for the next connection can thereby also be determined from trends, for example.

The client profile can also contain multi-dimensional functions of random variables from previous connections of the customer of the digital telecommunications network. For example, the client profile may contain information about the average duration of a customer's connections as a function of the time of day. If the billing system then recognizes that a specific customer makes telephone calls which last longer in the evening than in the morning, or longer on Sunday than during the working week, the costs of subsequent connections are determined accordingly as a function of the time of day and/or the day of the week.

The usage fees are also determined from a dynamic overall client profile stored in a second memory area. The overall client profile is derived from one or multiple random variables from previous connections of at least one group of users of the digital telecommunications network and it is dynamically adapted. The statistical load on the system, on which load the usage fees are dependent, can be determined from the overall user profile. The random variables used for the derivation of the overall client profile preferably contain the connection time, the time of day, the day of the week, and/or geographic characteristics of previous connections.

In this way, at the time of connection establishment, connection usage fees for new connections can be determined from the stored dynamic client profile and can be charged immediately to an account. These fees, however, are preferably communicated first to the user, the user having the possibility to interrupt the establishment of the connection if the price is too high for him.

In this way, the usage fees can be determined in a telecommunications terminal device, for instance in a fixed or mobile telephone. In this case, the terminal device contains a third memory area, which stores a pre-paid amount of money, as well as means for debiting or crediting this amount of money. This possibility is already available in GSM-mobile devices under the term advice of charge (AOC). The terminal device according to the invention further contains a processor to determine, and store in a first memory area, a dynamic client profile from one or multiple random variables of previous connections of the customer, and to determine from the stored dynamic client profile the amount for new connections and to debit this amount from the third memory area directly when a connection is established. The fees determined for new intended connections can be shown on the display of the device. Preferably, the usage fees also depend on a dynamic statistical overall client profile stored in a second memory area, the overall client profile being derived from one or multiple random variables of previous connections by at least one group of users of the digital telecommunications network.

For example, the terminal device may contain a chipcard, for instance a SIM-card, comprising storage means and processing means for carrying out the billing method according to the invention. The method according to the invention may be carried out just as well in a billing system intended for the determination of telecommunications network usage fees or in any programmable device. The programmable device is preferably controlled by a computer program stored in a data carrier.

According to the invention, the usage fee for a connection or for signalling is not determined from this connection's random variables, such as duration, time of day, or distance, but from a client profile established from random variables of (all) previous connections of the customer. For instance, the costs of the next connection can be determined from the mean value of the duration of all previous connections of the customer. In this way, the costs of the connection can be determined during or even prior to establishing the connection, without having to wait for termination of the connection. For example, the costs can be charged to a pre-paid card or to a bank account. Thus, the signalling traffic can be simplified because signalling information does not need to be transmitted in real-time, but can be communicated later, so that changes to the user's client profile can be carried out afterwards.

The usage fee preferably further depends on a dynamic overall client profile determined by means of random variables from (all) previous connections of all users, or of at least one group of users. The determination of fees can also be adapted dynamically to the load on the system.

This method can be used not only between a service provider and the user, but also between a service provider and a user <sic.>, or between a carrier and an operator, or between an operator and a service provider. In this last case, the service provider is viewed as the customer of the operator, and the client profile is derived from one or more random variables of previous connections of the service provider. The usage fees, which are billed to the service provider, are determined in this case periodically from this client profile.

Although only one embodiment example for the special case of determining fees in a GSM-network is described more closely in the following description, the method according to the invention can also be used for another mobile radio network, for example a UMTS or IN network, or for a fixed network, Internet, Intranet and Extranet, or for other telecommunications systems.

The present invention will be better understood with the aid of the description, given by way of example, and illustrated by means of the appended figures.

Figure 1:
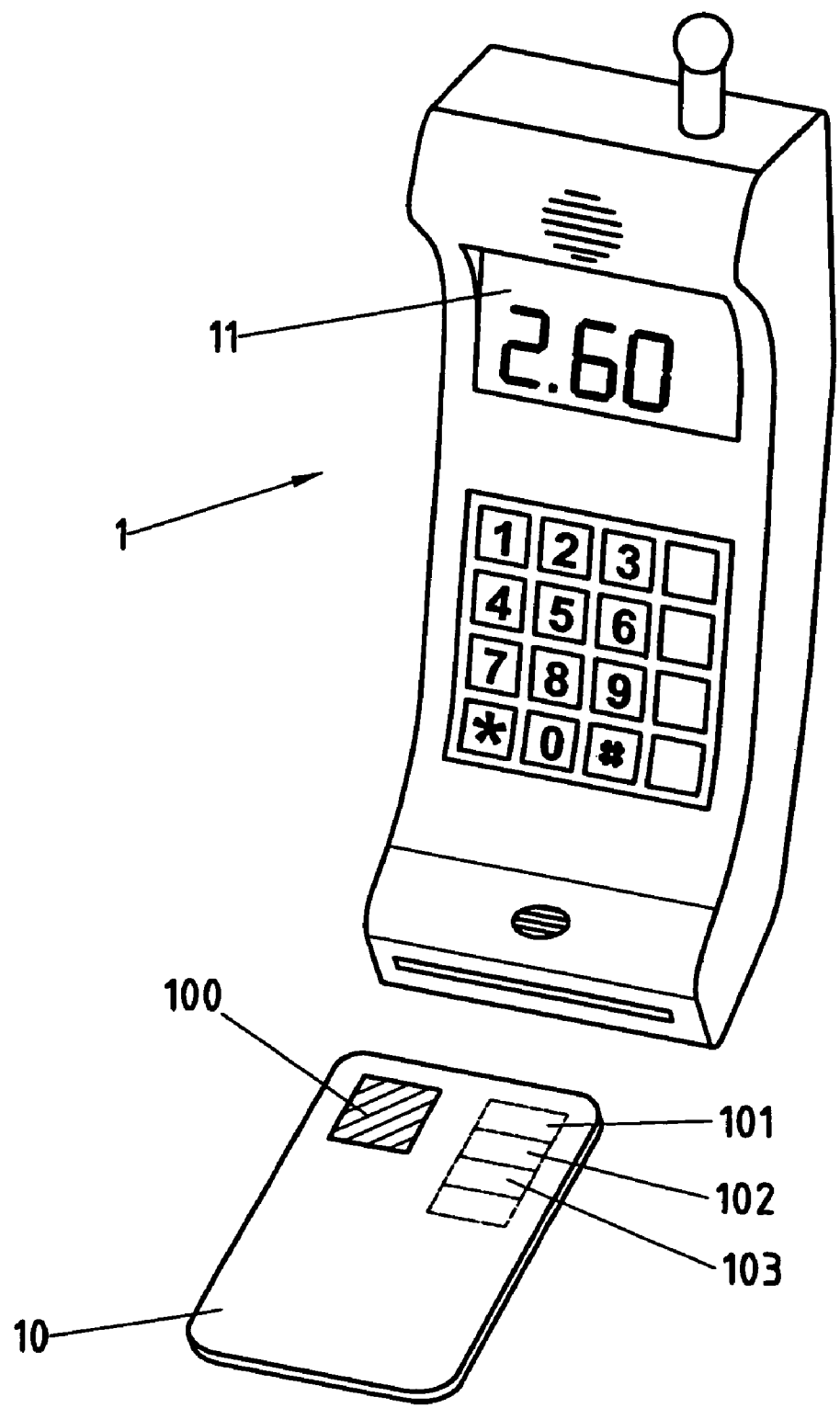
FIG. 1 shows a perspective representation of a terminal device which can execute the method according to the invention.
Figure 2:
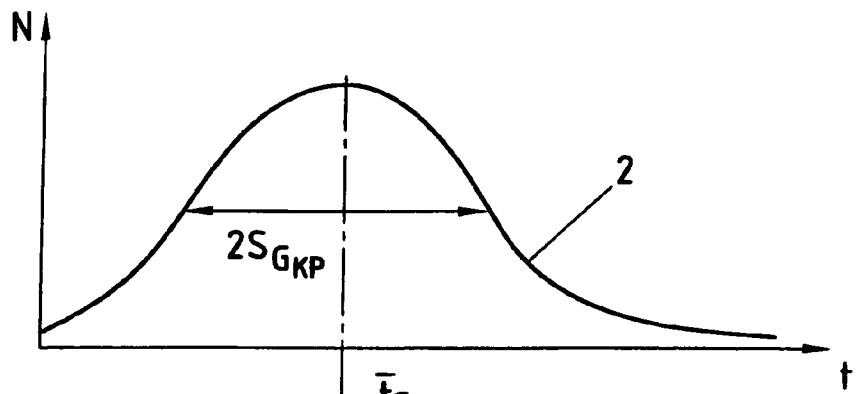
FIG. 2 shows the statistical distribution of the overall client traffic, which distribution can be stored in a second memory area.

FIG. 2 shows the statistical distribution of the overall client traffic, which distribution is derived from all connections of all customers. The curve shows the number of connections as a function of the duration of the connections. From this curve, the mean value $t_{Gkp}$ and the variance S can be determined, for example a mean value $t_{Gkp}$ of 80 seconds and a variance of 35 seconds. The timing characteristics of 95% of all connections is covered within $t_{Gkp}+2S$.

Depending on the application, other random variables of connections of customers can be used individually or in combination, for example the connection times, the times of the day, the day of the week, the holidays, the distances (national/national, national/international, international/international), and/or the location (of participant A and/or of participant B). The overall client profile, which can be stored, for instance, in a memory area, preferably contains one or multiple statistical parameters of the distribution of the overall client traffic, such as mean value, variance, class, moving average, distribution in pre-defined classes, etc. of the overall customer traffic distribution. The overall client profile is preferably determined dynamically on a periodic basis, for example daily or weekly, or after each connection.

From this overall client profile the revenue figures (mean time per connection and mean revenue per connection) can be defined. These revenue figures are decisive for the individual service user.

Each customer has his own client profile. The client profile of a new customer is based on the overall client profile. The amount to be billed for a new connection is predicted from the client profile during or even prior to this connection, and is possibly billed immediately. After each connection, the client profile is adapted in correspondence with a suitable algorithm, according to FIG. 5. For instance, if a connection which was just closed is longer or shorter than the mean value $t_{kp}$, the statistical client profile is corrected accordingly. The fees for the next connections of the customer are thereby corrected.

The fees charged to the customer are virtually uninfluenced by the method according to the invention, at least after a sufficient number of connections and if the interest is not considered. Therefore, the method and system according to the invention are independent of the price policy of the carrier, network operator or service provider.

Figure 3:
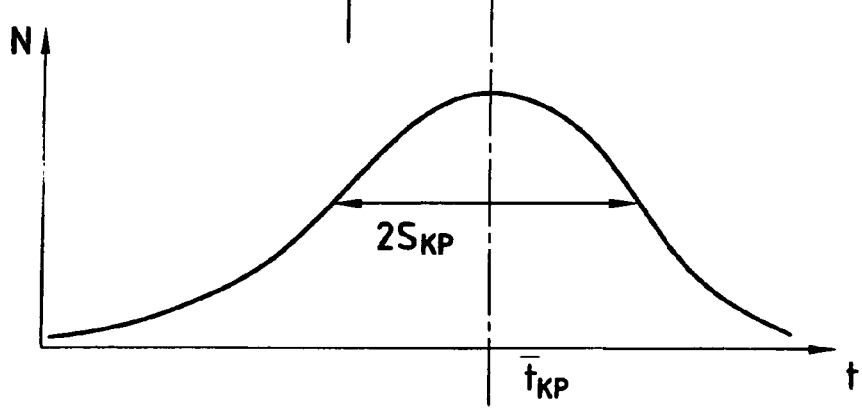
FIG. 3 shows the statistical distribution of the client traffic, which distribution can be stored in a first memory area.

FIG. 3 shows the client traffic distribution for a specific client, which distribution is derived from all connections between a service provider and the specific service users (or between an operator and a service provider as the customer). In this case, the curve shows the number of connections of the customer as a function of the duration of the connections. From this curve, the client profile with the mean value $t_{kp}$ and the variance $S_{kp}$ can be derived. Preferably, the client profile, which can also be stored in a memory area, contains one or multiple statistical parameters of the distribution of the client profile, such as mean value, variance, class, moving average, distribution in pre-defined classes, etc., of the customer traffic distribution. In the simplest embodiment, the client profile contains only the average price per connection for this customer. In a preferred embodiment, the client profile contains, in addition, information about the duration of connections of this customer, for instance the mean value and the variance of this duration. Preferably, however, the client profile contains more information about this duration, for instance also the distribution in pre-defined classes, and about other random variables of connections, so that the costs for the subsequent connections can be predicted reliably. This information is preferably registered multi-dimensionally so that, for example, the client profile contains information about the usual behavior of the customer as a function of the time of day and/or the day of the week, for instance in order to execute the dynamic determination of the fees differently in the morning than in the afternoon, according to the habits of the customer.

The dynamic user profile can be stored in a first memory area 101, preferably in a SIM chipcard 10, if the billing method is carried out directly in a terminal device, for instance in a mobile telephone 1. The overall client profile can be stored in a second memory area 102, for instance. After each new connection, the chipcard processor 100 determines the dynamic client profile depending on one or multiple random variables, and determines the usage fee for new connections from the stored dynamic client profile and possibly from the overall client profile.

If the card contains a third memory area storing a pre-paid amount of money, the usage fee can be debited directly from this memory area prior to, or after, the connection. In a variant, the usage fee is charged to a bank account, or, if the card is provided with Trusted Third Party functions, the usage fee is signed electronically in the card and encrypted, and charged to a corresponding account. This is possible, for example, if the card is a GSM-SIM-card which is provided with GSM 11.14 functions and with functions of the method described in the patent document EP689368. By means of these functions, it is possible to read time parameters from the card, which parameters serve as the basis for calculating the client profile.

Preferably, the client profile is corrected or adapted dynamically on a regular basis or after each connection. However, it is not necessary that this client profile is adapted in real-time. Thus, it is possible for the billing system to determine the statistical client profile when it is under less of a load, for instance outside the peak times, and need not be overdimensioned for the processing of connection information in real-time. For instance, this adaptation can be done on the basis of connection information known in the GSM-domain as call detail records (CDR), which are currently also being used for billing in the different layers. However, the connection information does not need to be transmitted to the billing system during the time of the connection.

Billing may take place in a billing system contained, for example, in an operating center, in the terminal device, or in a SIM-card in the telecommunications network.

Figure 4:
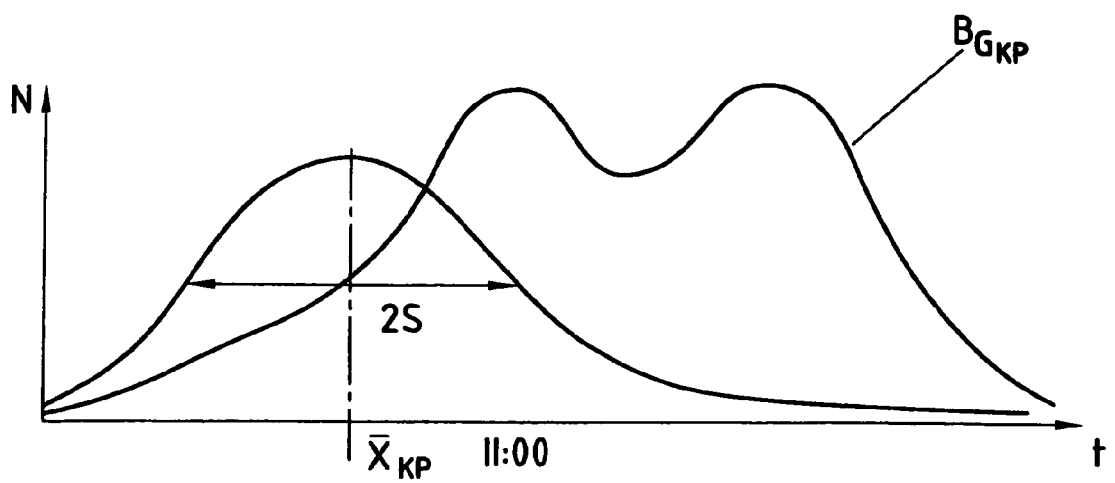
FIG. 4 shows the overall load on the system and the load by the client, both as a function of the time of day.

It is also possible to statistically determine in a system the average system load $B_{gkp}$ developing in the course of a day. FIG. 4 shows the number of connections of all service users as a function of time (daily load of the system). For example, a day-time discount can be derived from this system load, which discount can control the system usage on the client side. For instance, the traffic fee to be paid can be modulated according to the system's capacity utilization. For instance, if it is determined from the client profile that, with a small variance of S, the customer typically telephones at the time $x_{kp}$, he may benefit from a daytime discount, if $x_{kp}$ corresponds to a time with a small system load.

Analogous to this process, the traffic fee to be paid can be determined also for all other random variables mentioned above. Client profiles of individual clients can be combined in group profiles of friends and families, companies, etc.

Statistical discounts (moving of statistical parameters on the time axis) can also be used.

For example, the invention can be used by a service provider who sells services outside telecommunications (e.g. a financial service provider) and who sells connections as value-added services. With the present invention, billing of subscriptions and traffic costs to service users becomes much simpler.

Thus, the present invention makes it possible to debit the costs of connections in advance (debit systems instead of conventional credit billing systems). Thereby, possibilities of fraud may be reduced significantly.

Figure 5:
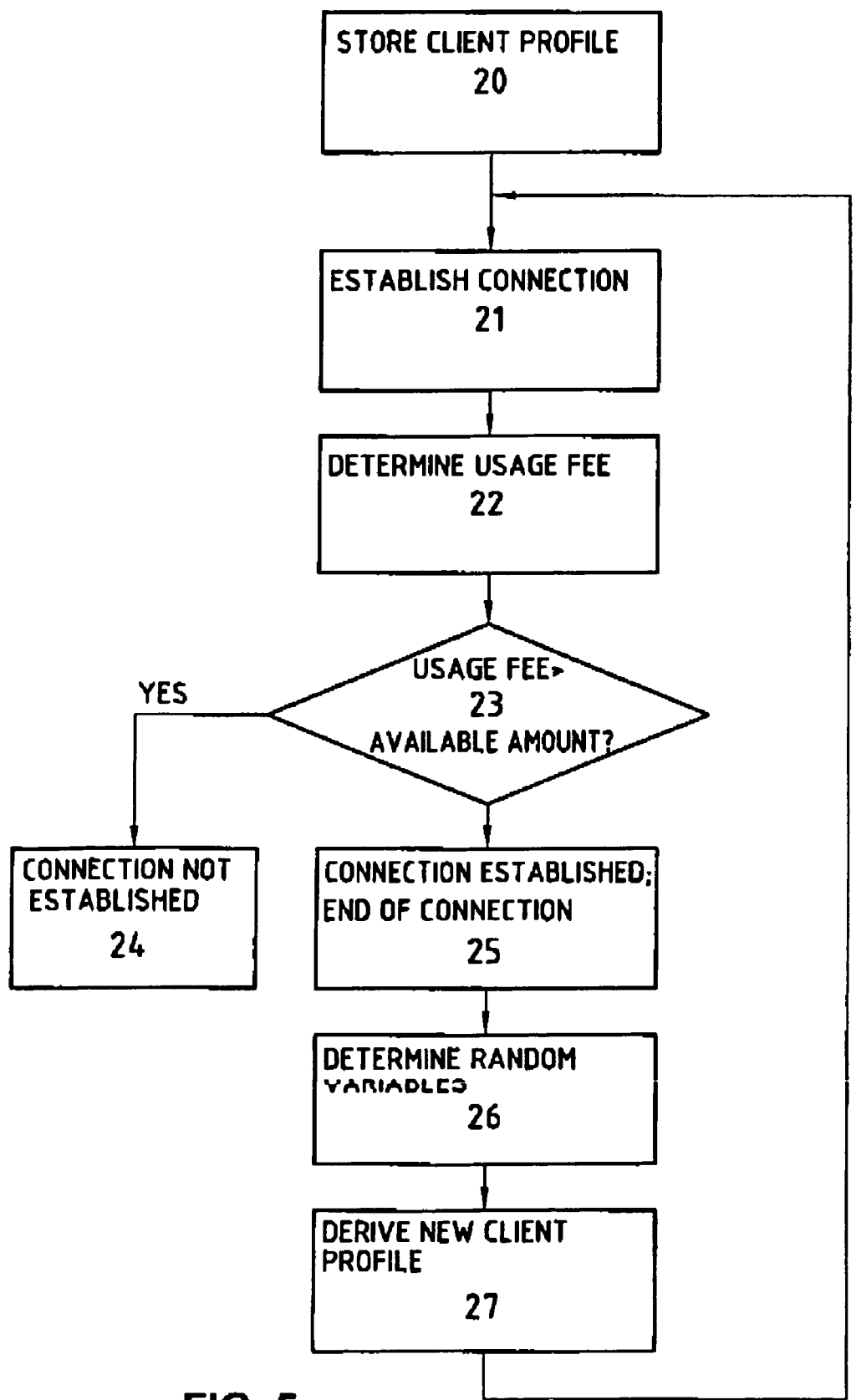
FIG. 5 shows a flow chart of the billing method.

Text for flow chart in FIG. 5:
20 storing of the overall client profile as client profile, $t_{kp}:=t_{gkp}$, $S_{kp}:=S_{gkp}$.
21 establishing a connection
22 determination of the usage fee from the client profile
23 usage fee>available monetary amount?
24 connection not established
25 connection established; end of connection
26 determination of random variables: duration t, etc.
27 derivation of a new client profile with characteristics of the last connection, $t_{kp}=f(t_{kp},t)$, . . .

The invention claimed is:

1. A customer terminal device comprising:
a pre-paid amount memory area configured to store pre-payment data corresponding to a pre-paid amount of money;
a first profile memory area configured to store a dynamic client profile; and
a processor configured to:
determine the dynamic client profile based only on at least one random variable of a previous connection,
store the dynamic client profile in the first profile memory area,
determine a present cost associated with a new connection based on the dynamic client profile, and
modify the pre-payment data based on the present cost prior to termination of the new connection.

2. A customer terminal device according to claim 1, further comprising a display configured to display the amount for new connections.

3. A customer terminal device according to claim 2, further comprising:
a second profile memory area configured to store an overall client profile,
wherein the present cost for the new connection is determined based on the overall client profile, and wherein the overall client profile is derived from one or multiple random variables of previous connections of at least one group of customers of a digital telecommunications network, the stored overall client profile being adapted dynamically.

4. A customer terminal device according to claim 2, wherein the at least one random variable includes at least one of connection duration, time of day, day of the week, and geographic characteristics of the previous connection.

5. A customer terminal device according to claim 2, wherein the present cost for the new connection is dependent on a statistical system load obtained from the overall client profile.

6. A chipcard configured for use in a telecommunications device, comprising:
 a first memory area configured to store pre-payment data corresponding to a pre-paid amount of money;
 a second memory area configured to store a dynamic client profile;
 means for determining the dynamic client profile based only on at least one random variable of a previous connection;
 means for determining a usage fee for a new connection based on the dynamic client profile;
 means for modifying the pre-payment data to reflect a deduction of the pre-paid amount of money by an amount of the usage fee; and
 means for changing the dynamic client profile based on at least one random variable of the new connection.

7. A chipcard according to claim 6, further comprising:
 a third memory area configured to store an overall client profile,
 wherein the usage fee for the new connection is determined from the overall client profile, and
 wherein the overall client profile is derived from at least one random variable of previous connections of at least one group of customers of a digital telecommunications network, said overall client profile being adapted dynamically.

8. A chipcard according to claim 6, wherein the at least one random variable includes at least one of connection duration, time of day, day of the week, and geographic characteristics of the previous connection.

9. A chipcard according to claim 6, wherein the usage fee for the new connection is dependent on a statistical system load obtained from the overall client profile.

* * * * *